No. 765,284. Patented July 19, 1904.

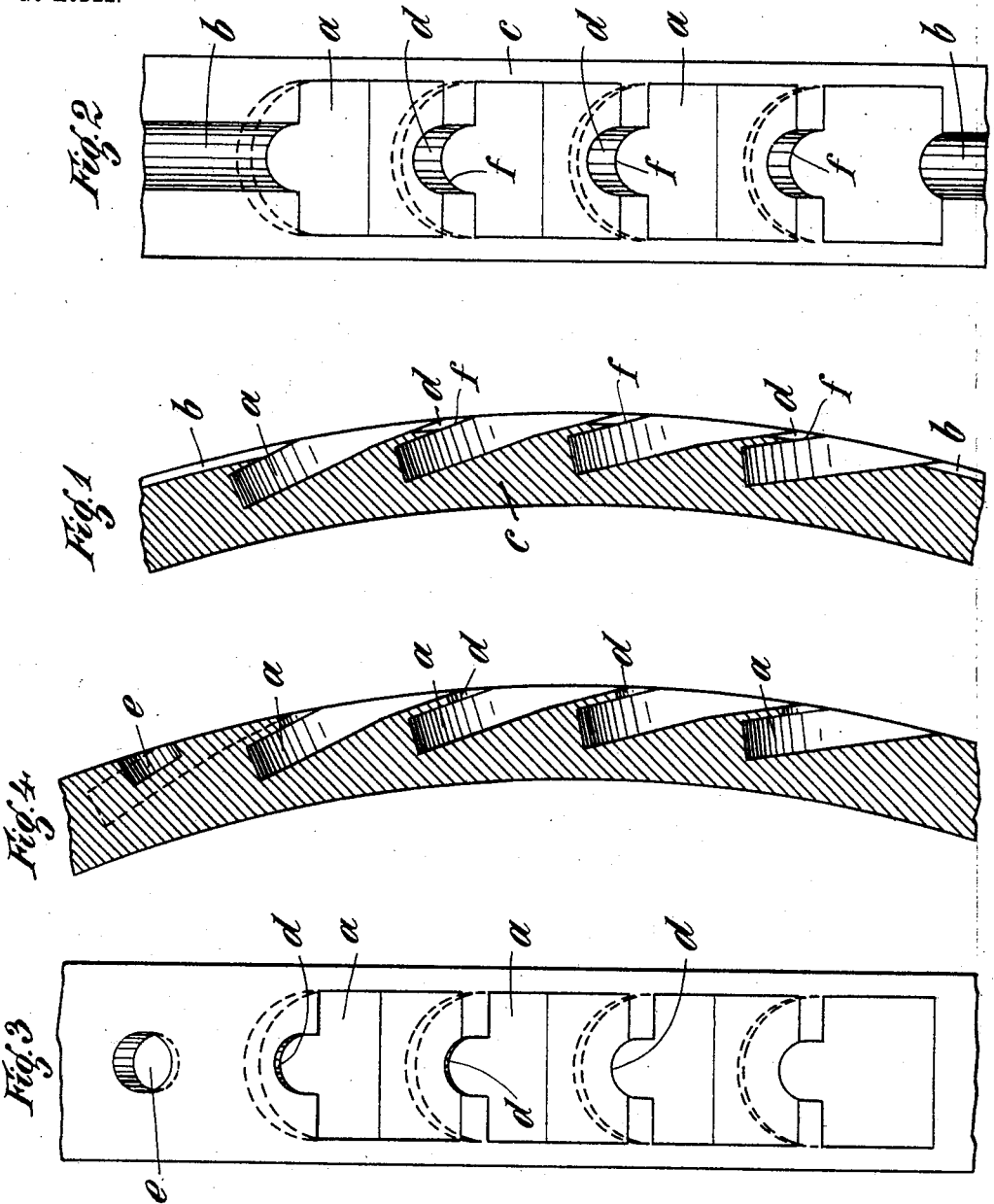

UNITED STATES PATENT OFFICE.

MAX KAUFHOLD AND JUSTUS HOFFMANN, OF ESSEN, GERMANY, ASSIGNORS TO MASCHINENBAU-ACTIEN-GESELLSCHAFT UNION, OF ESSEN, PRUSSIA, GERMANY.

METHOD OF FORMING U-SHAPED BUCKETS OR POCKETS IN THE RIMS OF GAS OR STEAM TURBINES.

SPECIFICATION forming part of Letters Patent No. 765,284, dated July 19, 1904.

Application filed February 5, 1904. Serial No. 192,186. (No model.)

*To all whom it may concern:*

Be it known that we, MAX KAUFHOLD, a subject of the King of Prussia, residing at No. 7 Elisabethstrasse, Essen, in the Kingdom of Prussia, German Empire, and JUSTUS HOFFMANN, also a subject of the King of Prussia, residing at No. 118 Schlenhofstrasse, in the same town, have invented an Improved Method of Forming Pockets in Turbines, of which the following is a specification.

This invention relates to that description of turbines worked by steam and gaseous pressure in which the rims of the turbine-wheels and the guide-rings are formed with U-shaped buckets or pockets, in which the entering steam or gas is caused to turn back through an angle of one hundred and eighty degrees.

In order to insure a change in direction of the motive fluid of one hundred and eighty degrees, it is necessary that the curved lower portion of the recess should correspond to a complete half-circle, and this is only rendered possible when formed with a disk-cutter having its shaft projecting at an angle with the plane thereof by providing in that portion of the metal overhanging the pockets a slot to receive the shaft of the cutter, and thus permit the cutter to enter more deeply beneath the surface of the wheel.

According to a known method of forming these buckets or pockets they are produced by a stepped rotary cutter, of which the part of larger diameter serves to cut out the bucket, while the part of smaller diameter cuts a slot in the part of the metal overhanging the bucket.

The present invention relates to a method of forming the said buckets or pockets by means of a simple rotary cutter instead of by means of a compound or stepped cutter, as heretofore, this being rendered possible by first forming the slots in the part of the metal overhanging the buckets or pockets, by means of which space is afforded for the shaft of the rotary cutter for cutting the buckets, so that this can effect the complete cutting out thereof. The said slots can be produced either by cutting a peripheral groove all round the turbine-wheel or by merely boring or cutting holes in the periphery at the required points.

Figures 1 and 2 of the accompanying drawings show, respectively, a part transverse section and a part end view of the first-described arrangement, while Figs. 3 and 4 show corresponding views of the second arrangement.

Referring to Figs. 1 and 2, $c$ is part of a turbine-wheel in which the slots $d$ are produced by first cutting a circular groove $b$ of the required shape round the periphery of the wheel, the width of the groove being about equal to the diameter of the shaft of the rotary cutter that is to cut the buckets. The U-shaped buckets $a$ can then be cut in the wheel $c$ by means of a simple rotary disk cutter, the shaft of which enters the notches or slots $d$ previously formed as the cutter moves inward during the progress of the cutting.

In the arrangement shown in Figs. 3 and 4 there are first formed in the periphery of the turbine-wheel at those points where the slots $d$ have to be situated holes $e$, produced by boring or cutting, the diameter of which is about equal to the diameter of the shaft of the rotary cutter which is to cut the buckets. These are then cut to a depth determined by the coming in contact of the cutter-shaft with the end of the slot produced by the previously-bored hole.

As shown in Fig. 3, the walls of the slots $d$, formed according to the last-described method, are at right angles to the surfaces of the metal covering the buckets, while the slots formed by previously cutting the circular groove $b$ have their walls lying obliquely to the surfaces of the metal, so as to produce a sharp inner edge $f$, Fig. 1, whereby a smaller loss by leakage is insured.

Having thus described the nature of this invention and the best means we know of carrying the same into practical effect, we claim—

1. The method of forming U-shaped pockets in turbine-wheels, which consists in cutting away the periphery of the wheel at points corresponding to the axes of the pockets, and then forming the pockets by means of a rotary cutter having its shaft corresponding with the cut-away portions of the wheel.

2. The method of forming U-shaped pockets in turbine-wheels, which consists in cutting a groove in the periphery of the wheel at a position corresponding to the axes of the pockets, and then forming the pockets by means of a rotary cutter having its shaft corresponding with the groove.

In witness whereof we have hereunto set our hands in presence of two witnesses.

MAX KAUFHOLD.
JUSTUS HOFFMANN.

Witnesses:
WILLIAM ESSENWEIN,
PETER LIEBER.